(12) United States Patent
Sakai

(10) Patent No.: US 11,537,344 B2
(45) Date of Patent: Dec. 27, 2022

(54) PRINTING APPARATUS AND PRINTING METHOD FOR DISPLAYING OPERATION HISTORIES

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/475,410

(22) Filed: Sep. 15, 2021

(65) Prior Publication Data

US 2022/0083298 A1 Mar. 17, 2022

(30) Foreign Application Priority Data

Sep. 17, 2020 (JP) .............................. JP2020-156019

(51) Int. Cl.
*G06F 3/12* (2006.01)
*H04N 1/00* (2006.01)

(52) U.S. Cl.
CPC .......... *G06F 3/1273* (2013.01); *G06F 3/1207* (2013.01); *H04N 1/00411* (2013.01); *H04N 1/00474* (2013.01); *H04N 1/00477* (2013.01)

(58) Field of Classification Search
None
See application file for complete search history.

(56) References Cited

U.S. PATENT DOCUMENTS

| | | | |
|---|---|---|---|
| 10,949,151 B2 | 3/2021 | Yoshida | |
| 11,079,992 B2* | 8/2021 | Omori | H04N 1/00474 |
| 2010/0290068 A1* | 11/2010 | Okada | H04N 1/00456 |
| | | | 358/1.9 |
| 2014/0036291 A1* | 2/2014 | Fujishita | H04N 1/00424 |
| | | | 358/1.13 |
| 2017/0090466 A1* | 3/2017 | Uomori | G05B 23/0216 |
| 2018/0067978 A1* | 3/2018 | Matsuura | G06F 16/23 |
| 2018/0220015 A1* | 8/2018 | Akuzawa | H04N 1/21 |
| 2019/0245989 A1* | 8/2019 | Yoshida | G06F 3/1205 |
| 2019/0384537 A1 | 12/2019 | Arai et al. | |
| 2020/0076970 A1* | 3/2020 | Chiba | G06F 3/1273 |
| 2020/0159479 A1 | 5/2020 | Yoshida | |
| 2020/0162628 A1 | 5/2020 | Horiike et al. | |
| 2021/0314454 A1* | 10/2021 | Chiba | H04N 1/00411 |
| 2022/0083299 A1* | 3/2022 | Sakai | G06F 3/1204 |

FOREIGN PATENT DOCUMENTS

| | | |
|---|---|---|
| JP | 2020-088412 A | 6/2020 |
| JP | 2020-088440 A | 6/2020 |

* cited by examiner

*Primary Examiner* — Henok Shiferaw
(74) *Attorney, Agent, or Firm* — Global IP Counselors, LLP

(57) ABSTRACT

A printing apparatus that performs timeline display of a plurality of items corresponding to operation histories in past is provided, the printing apparatus including a receiving section configured to receive reprinting based on a first item selected out of the timeline-displayed plurality of items and a display control section configured to timeline-display a second item corresponding to an operation history of the reprinting based on the first item in a display form having a decided relation between the second item and the first item.

9 Claims, 8 Drawing Sheets

PRINTING APPARATUS AND PRINTING METHOD FOR DISPLAYING OPERATION HISTORIES

The present application is based on, and claims priority from JP Application Serial Number 2020-156019, filed Sep. 17, 2020, the disclosure of which is hereby incorporated by reference herein in its entirety.

BACKGROUND

1. Technical Field

The present disclosure relates to a printing apparatus, a print producing method, and a program.

2. Related Art

There is a technique for displaying items corresponding to operation histories in the past of an apparatus side by side in time-series order.

JP-A-2020-88440 (Patent Literature 1) discloses a technique for displaying, in time order, side by side, a plurality of history records indicating histories of executed jobs and displaying error records, which indicate errors, side by side with the history records. JP-A-2020-88412 (Patent Literature 2) discloses a technique applicable to a configuration for displaying, on a timeline, an execution history of a function of using a saved file.

When items corresponding to operation histories in the past are displayed side by side in time-series order and a reoperation of an operation performed in the past is performed, items corresponding to operation histories of the reoperation is generated in addition to items corresponding to operation histories of an original operation. In this way, the items sometimes have a relation in which the items correspond to the operation histories of the related operations. When the items corresponding to the operation histories in the past displayed side by side in time-series order are visually recognized, there is a desire to grasp the items having such a relation. However, simply by displaying the items corresponding to the operation histories in the past side by side in time-series order as in related art, it is difficult to grasp the items having such a relation.

SUMMARY

A printing apparatus, that performs timeline display of a plurality of items corresponding to operation histories in past, includes: a receiving section configured to receive reprinting based on a first item selected out of the timeline-displayed plurality of items; and a display control section configured to timeline-display a second item corresponding to an operation history of the reprinting based on the first item in a display form having a decided relation between the second item and the first item and timeline-display a third item corresponding to an operation history different from both of the operation history of the reprinting based on the first item and an operation history of the reprinting based on the second item in a display form not having the decided relation with both of the first item and the second item.

A print producing method is executed by a printing apparatus that performs timeline display of a plurality of items corresponding to operation histories in past, and the print producing method includes: receiving reprinting based on a first item selected out of the timeline-displayed plurality of items; timeline-displaying a second item corresponding to an operation history of the reprinting based on the first item in a display form having a decided relation between the second item and the first item and timeline-displaying a third item corresponding to an operation history different from both of the operation history of the reprinting based on the first item and an operation history of the reprinting based on the second item in a display form not having the decided relation with both of the first item and the second item; and, when any one of the plurality of items is selected by a user, performing the reprinting according to setting included in an operation history corresponding to the selected item to produce a print.

A non-transitory computer-readable storage medium stores a program for causing a computer, which performs timeline display of a plurality of items corresponding to operation histories in past, to function as: a receiving function for receiving a reoperation based on a first item selected out of the timeline-displayed plurality of items; and a display control function for timeline-displaying a second item corresponding to an operation history of the reoperation based on the first item in a display form having a decided relation between the second item and the first item and timeline-displaying a third item corresponding to an operation history different from both of the operation history of the reoperation based on the first item and an operation history of the reoperation based on the second item in a display form not having the decided relation with both of the first item and the second item.

An apparatus, that performs timeline display of a plurality of items corresponding to operation histories in past, includes: a receiving section configured to receive a reoperation based on a first item selected out of the timeline-displayed plurality of items; and a display control section configured to timeline-display a second item corresponding to an operation history of the reoperation based on the first item in a display form with which a user is capable of recognizing a relation with the first item.

DESCRIPTION OF EXEMPLARY EMBODIMENTS

Embodiments of the present disclosure are explained below according to order described below.

(1) First Embodiment
(1-1) Configuration of a printing apparatus
(1-2) Details of processing of the printing apparatus
(2) Second Embodiment
(2-1) Configuration of a printing apparatus
(2-2) Details of processing of the printing apparatus
(3) Other embodiments

(1) First Embodiment

(1-1) Configuration of a Printing Apparatus

Figure 1:
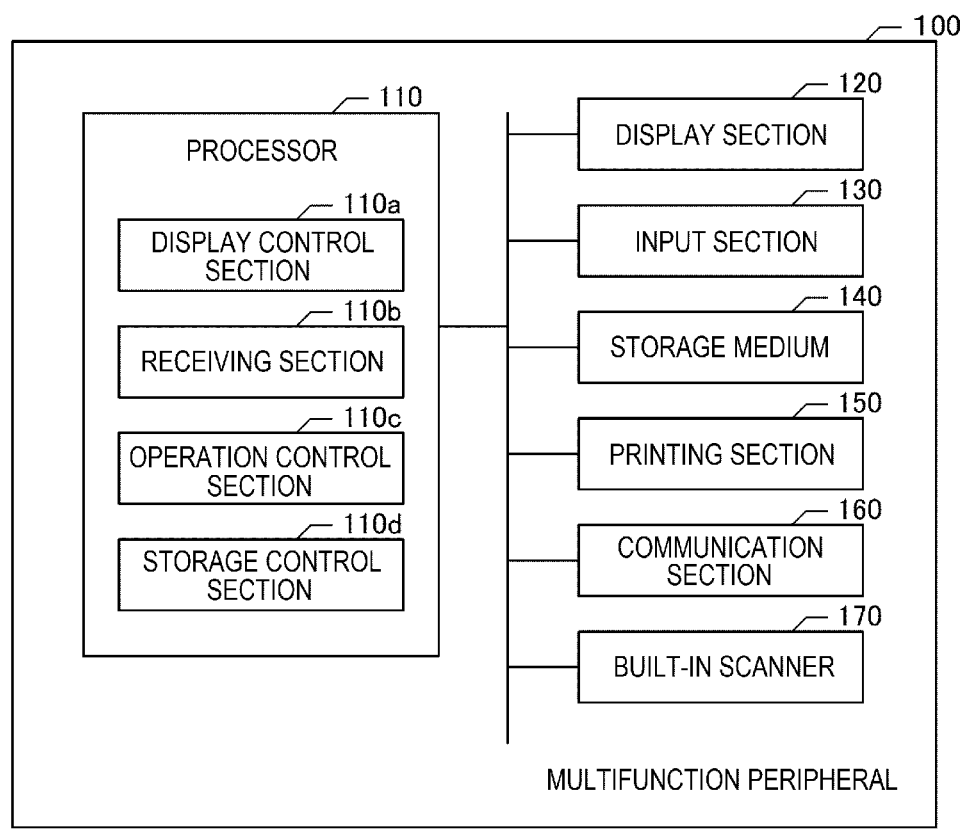
FIG. 1 is a diagram showing an example of the configuration of a printing apparatus.

FIG. 1 is a diagram showing an example of the configuration of a multifunction peripheral 100 functioning as a printing apparatus in a first embodiment. The multifunction peripheral 100 in this embodiment includes a plurality of functions such as a copy function, a FAX function, and a scan function and includes a plurality of operation modes such as a copy mode for executing the copy function, a FAX mode for executing the FAX function, and a scan mode for executing the scan function. The copy mode is a mode for executing an operation for scanning a document and printing a scan result. The FAX mode is a mode for executing an operation for scanning a document and transmitting a scan result to a designated transmission destination. The scan mode is a mode for executing an operation for scanning a document and saving a scan result in a designated saving destination. The multifunction peripheral 100 includes a processor 110, a display section 120, an input section 130, a storage medium 140, a printing section 150, a communication section 160, and a built-in scanner 170.

The processor 110 includes a central processing unit (CPU), a random access memory (RAM), and the like, executes a program stored in the storage medium 140 or the like, and controls the multifunction peripheral 100. The processor 110 may be configured by a single chip or may be configured by a plurality of chips.

The display section 120 causes a display device such as a monitor or a touch panel to display information such as an operation screen of the multifunction peripheral 100. The display device may be a part of the multifunction peripheral 100 or may be a part of another apparatus. The display section 120 may cause the display device to display the information by projecting the information. The input section 130 is used to input information to the multifunction peripheral 100. The input section 130 is configured by, for example, hard buttons, an operation detecting section of the touch panel, or the like.

The storage medium 140 stores various programs, information concerning various screens, operation histories in the past of the multifunction peripheral 100, information concerning printing jobs executed in the past, and the like. The storage medium 140 is, for example, a read only memory (ROM), a hard disk drive (HDD), or a solid state drive (SSD).

The printing section 150 performs printing on a printing medium such as paper to produce a print according to an instruction from the processor 110. In this embodiment, the printing section 150 performs printing in an inkjet scheme but may perform printing in another scheme such as a laser printer scheme. The printing section 150 includes a conveying mechanism that conveys a printing medium and a printing head that ejects ink droplets to the printing medium.

The communication section 160 includes an interface for performing communication conforming to various communication protocols by wire or radio with an external device such as a client PC (personal computer) that uses the multifunction peripheral 100. Input devices such as a keyboard and a mouse and an output device such as a monitor are coupled to the processor 110 via the communication section 160. The processor 110 may perform input and output of various kinds of information via these devices.

The built-in scanner 170 includes a light source, a sensor, and the like, irradiates light on a document from the light source, reads light reflected by the document with the sensor, and acquires image data of the document.

In this embodiment, the processor 110 executes a program stored in the storage medium 140 to function as a display control section 110a, a receiving section 110b, an operation control section 110c, and a storage control section 110d. The display control section 110a is a function of controlling display of information on the display section 120. The receiving section 110b is a function of receiving an instruction for a reoperation based on a history item. The operation control section 110c is a function of performing control to execute an operation such as printing or FAX transmission according to an instruction for execution of the operation via a screen displayed by the display control section 110a. The storage control section 110d is a function of storing information concerning printing jobs executed by the operation control section 110c in the storage medium 140.

The display control section 110a in this embodiment displays, in a decided display form, a history item about an operation executed again according to selection of an item indicating an operation history.

Figure 2:
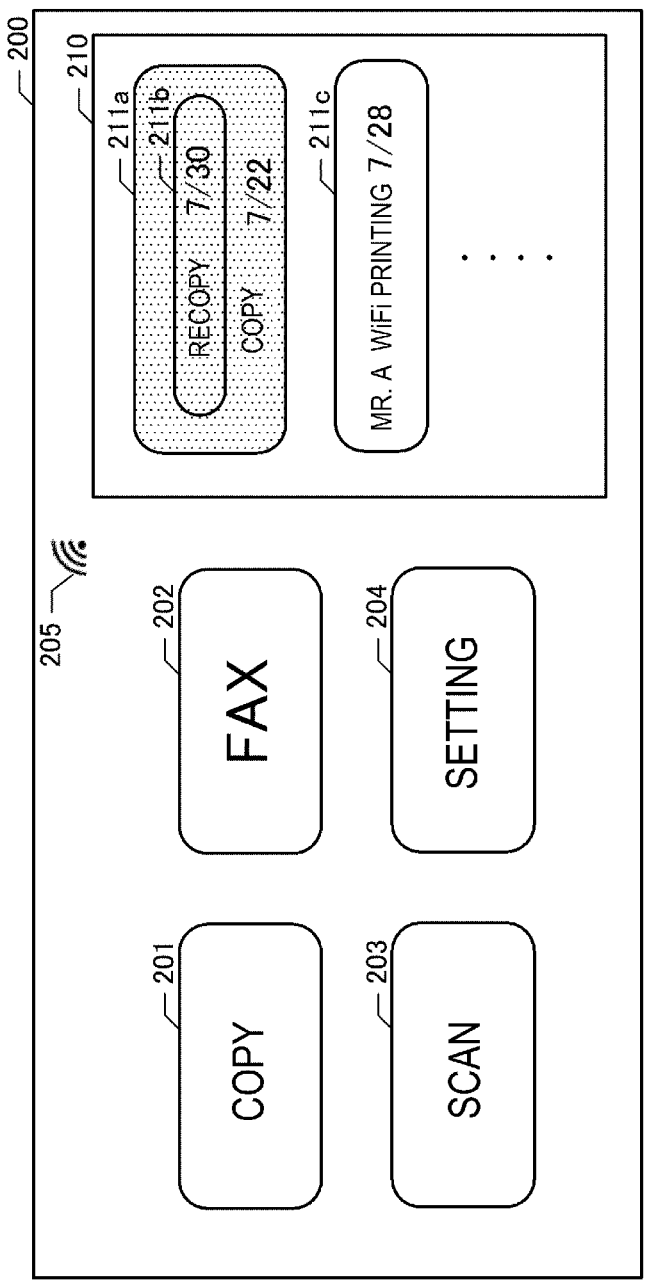
FIG. 2 is a diagram showing an example of a main screen.

When the multifunction peripheral 100 is started, the processor 110 functions as the display control section 110a and displays a main screen 200 shown in FIG. 2 on the display section 120. In this embodiment, the processor 110 acquires information concerning the main screen 200 (information such as items in the screen and arrangement positions of the items) from the storage medium 140, generates the main screen 200 based on the acquired information, and displays the main screen 200.

The main screen 200 includes mode items 201 to 204, a radio wave mark 205, and a history display region 210.

The mode items 201 to 204 are respectively items (objects) used for instructions for shift to operation modes corresponding to the mode items 201 to 204. In this embodiment, the mode items 201 to 204 are respectively soft buttons. However, the mode items 201 to 204 may be other items such as images or text display blocks.

The mode item 201 is an item used for an instruction for shift to the copy mode for executing the copy function. The mode item 202 is an item used for an instruction for shift to the FAX mode for executing the FAX function. The mode item 203 is an item used for an instruction for shift to the scan mode for executing the scan function. The mode item 204 is an item used for an instruction for shift to a setting mode for executing a function of changing setting of the multifunction peripheral 100.

The radio wave mark 205 is an item indicating the intensity of a radio wave in wireless communication performed by the multifunction peripheral 100. In this embodiment, the multifunction peripheral 100 performs the wireless communication with an external device using the wireless communication port via the communication section 160. The radio wave mark 205 is an item corresponding to the wireless communication port.

The history display region 210 is a region where history items 211 indicating operation histories in the past of the multifunction peripheral 100 are timeline-displayed (displayed in time-series order) about periods when operations were performed. In this embodiment, every time the processor 110 executes an operation such as a printing job or scan, the processor 110 stores an operation mode, a value of each of setting items, a date and time, and a user of the operation in the storage medium 140 as information concerning an operation history in association with one another. When displaying the history items 211, the processor 110 extracts an operation mode and, if present, a user from operation histories corresponding to the history items 211 and displays the operation mode and the user on the history items 211. When the history item 211 is selected, the processor 110 extracts values of setting items from operation histories corresponding to the selected history item 211. When displaying a setting screen for an operation mode corresponding to the selected history item 211, the processor 110 sets a state in which the extracted values are selected on the setting screen.

In this embodiment, the processor 110 displays the respective items 211 side by side in the longitudinal direction in the history display region 210 such that the history items 211 are displayed in upper parts as periods when operations were performed more recently. More specifically, the processor 110 extracts dates and times associated with the operation histories, sorts the operation histories in descending order about the extracted dates and times to specify time-series order, and displays, in the specified order, side by side, the history items 211 indicating the operation histories. However, the processor 110 may display the history items 211 in another display form. For example, the processor 110 may display the respective history items 211 in the history display region 210 such that the history items 211 are displayed in lower parts as the periods when the operations were performed are more recently. The processor 110 may display the respective history items 211 side by side in the lateral direction in the history display region 210. In that case, the processor 110 may display the history items 211 further to the right or further to the left as the periods when the operations were performed are more recently.

In this embodiment, the processor 110 generates the history display region 210 as a region that can be scrolled according to swipe operation in a decided direction on the touch panel of the input section 130, operation of a hard button of the input section 130, and the like. Consequently, the processor 110 can include the history items 211 in the history display region 210 even if not all of the history items 211 can be displayed on the display section 120 at a time.

In an example shown in FIG. 2, the history display region 210 includes a plurality of history items 211 (a history item 211a, a history item 211b, a history item 211c, ... ). The history item 211a indicates an operation history about copying performed on July 22. The history item 211b indicates an operation history about a reoperation based on the history item 211a, the reoperation being an operation performed on July 30. The history item 211c indicates an operation history of printing instructed from Mr. A via Wifi communication on July 28.

A reoperation (for example, reprinting or re-FAX transmission) based on the history item 211 is the same operation as an operation performed according to selection of the history item 211 and corresponding to the selected history item 211. In this way, the same operation as an operation performed in the past is sometimes performed again. In the following explanation, when the same operation is performed a plurality of times, an original operation performed first is referred to as original operation.

Processing in which the processor 110 executes a reoperation based on the history item 211 is explained. In this embodiment, when the history item 211 about an operation history of a decided type (for example, copying or FAX) is selected via the input section 130, the processor 110 performs control to enable re-execution of an operation of the operation history indicated by the selected history item 211.

More specifically, the processor 110 shifts to an operation mode corresponding to the selected history item 211 and displays a setting screen concerning the operation mode on the display section 120. The processor 110 adjusts values of setting items, which can be set via the setting screen, to the same values as values of the operation corresponding to the operation history indicated by the selected history item 211. The processor 110 sets operation target data (for example, a printed image in the copy mode or a transmitted image in the FAX mode) to the same data of the operation history indicated by the selected history item 211. In this way, the processor 110 enables a reoperation of the operation of the operation history indicated by the selected history item 211.

The processor 110 functions as the receiving section 110b and receives an execution instruction for an operation via the displayed setting screen. For example, the processor 110 detects selection of a button used for an instruction for execution of an operation on the displayed setting screen to receive an execution instruction for the operation. The processor 110 functions as the operation control section 110c and performs a reoperation of the operation corresponding to the selected history item 211.

In this embodiment, when performing the reoperation based on the history item 211, the processor 110 stores an operation history of the performed reoperation in the storage medium 140 in association with information indicating on which history item 211 the reoperation is based.

Consequently, an operation history about the reoperation based on the history item 211 corresponding to a certain operation (the original operation) is generated. The processor 110 also displays the history item 211 indicating the generated operation history. When a reoperation based on the history item 211 corresponding to the reoperation is performed, the history item 211 corresponding to the same operation as the original operation (a reoperation of the reoperation) is generated. In this embodiment, the history item 211 corresponding to the reoperation of the reoperation is also the history item 211 based on the history item 211 corresponding to the original operation.

The processing in which the processor 110 executes the reoperation based on the history item 211 is as explained above.

In this embodiment, when displaying the history item 211 in the history display region 210, the processor 110 performs the following. That is, the processor 110 displays the history item 211 corresponding to a reoperation based on the history item 211 corresponding to a certain operation (the original operation) in a display form having a decided relation with the history item 211 corresponding to the original operation. In the following explanation, the decided relation is referred to as display relation. In this embodiment, the display relation is a relation in which a color is common and a nested relation. That is, the processor 110 displays the history item 211 corresponding to the reoperation in a color common to the history item 211 corresponding to the original operation and to be a nest of the history item 211 corresponding to the original operation.

The processing in which the processor 110 displays the history item 211 in the history display region 210 is more specifically explained below.

The processor 110 acquires operation histories in the past from the storage medium 140. The processor 110 specifies, from the acquired operation histories, as a group having a relation in which corresponding operations are the same operations (hereinafter, related group), an operation history group in which corresponding operations are in a relation of an original operation and a reoperation. More specifically, the processor 110 specifies, as related groups, operation histories associated with information, which indicates a reoperation based on the same history item 211, and operation histories corresponding to the history item 211. The processor 110 specifies, about the respective specified related groups, the latest operation history among the operation histories included in the related groups.

The processor 110 displays, side by side, the history item 211 indicating the latest operation history of the related groups and the history item 211 indicating an operation history not belonging to all the related groups in time-series order about execution periods of operations corresponding to the history items 211. In this case, the processor 110 displays the history item 211 indicating the latest operation history of the related groups to be a nest of the history item 211 indicating an operation history of the original operation (the oldest operation history) in the related groups. That is, the processor 110 displays the history item 211 indicating the latest operation history of the related groups to be included in the history item 211 corresponding to the original operation. The processor 110 displays the history item 211 indicating the latest operation history of the related groups in a color common to the history item 211 corresponding to the original operation.

When three or more history items 211 are included in the related groups (when there are a plurality of history items 211 corresponding to the reoperation of the original operation), the processor 110 performs the following. That is, the processor 110 displays the history item 211 indicating an operation history different from both of the latest operation history and the operation history of the original operation in a display form having a display relation with the history item 211 corresponding to the original operation. That is, the processor 110 displays the history item 211 to be a nest of the history item 211 corresponding to the original operation and to have a color common to the history item 211 corresponding to the original operation.

In this way, the processor 110 includes, in the history item 211 corresponding to the original operation, the history item 211 corresponding to the reoperation. However, the processor 110 may include, in one of the history items 211 corresponding to the reoperation (for example, the history item 211 corresponding to the latest operation history among the history items 211 corresponding to the reoperation), the history item 211 corresponding to the original operation and the remaining history items 211 corresponding to the reoperation. The processor 110 also displays the history item 211 corresponding to the reoperation of the reoperation to be a nest of the history item 211 corresponding to the original operation. However, the processor 110 may display the history item 211 corresponding to the reoperation of the reoperation to be a nest of the history item 211 corresponding to the original reoperation.

The processor 110 displays the history item 211 indicating an operation history not belonging to all the related groups in a display form not having a display relation with the history items 211 corresponding to all the related groups. That is, the processor 110 displays the history item 211 indicating the operation history not belonging to all the related groups not to be a nest of the history items 211 belonging to all the related groups and to have a color different from colors of the history items 211 corresponding to all the related groups.

In the example shown in FIG. 2, the processor 110 displays the history item 211b corresponding to a reoperation (reprinting) performed on July 30 of a copy operation performed on July 22, which is an original operation, to be a nest of the history item 211a corresponding to the original operation. That is, the processor 110 displays the history item 211b to be included in the history item 211a. The processor 110 displays the history item 211a and the history item 211b in a common color. The processor 110 displays the history item 211c corresponding to an operation different from the original operation in a color different from the color of the history items 211a and 211b. The processor 110 displays the history item 211b displayed as the nest of the history item 211a, the history item 211c, and the other history items 211 in time-series order (timeline-displayed) about periods when operations corresponding to the history items were executed.

In this case, the processor 110 displays the history item 211a together with the history item 211b. Therefore, the processor 110 does not display the history item 211a in time-series order. Accordingly, the processor 110 does not display, between the history item 211a and the history item 211b, the history item 211c corresponding to the operation performed between the operation of the history item 211a and the operation of the history item 211b. In this way, when displaying the history item 211 corresponding to the reoperation to be a nest of the history item 211 corresponding to the original operation, the processor 110 performs control not to display, between the history item 211 corresponding to the original operation and the history item 211 corresponding to the reoperation, the history item 211 corresponding to another operation performed between the original operation and the reoperation. As the history item 211 corresponding to the original operation and the history item 211 corresponding to the reoperation, the history item 211 corresponding to the reoperation may be displayed in time-series following a period of the history item 211 corresponding to the original operation or the history item 211 corresponding to the original operation may be displayed in time-series following a period of the history item 211 corresponding to the latest reoperation. A history item corresponding to another operation performed between related history items is not included in the related history items. However, where the related history items are displayed is not limited.

Figure 3:
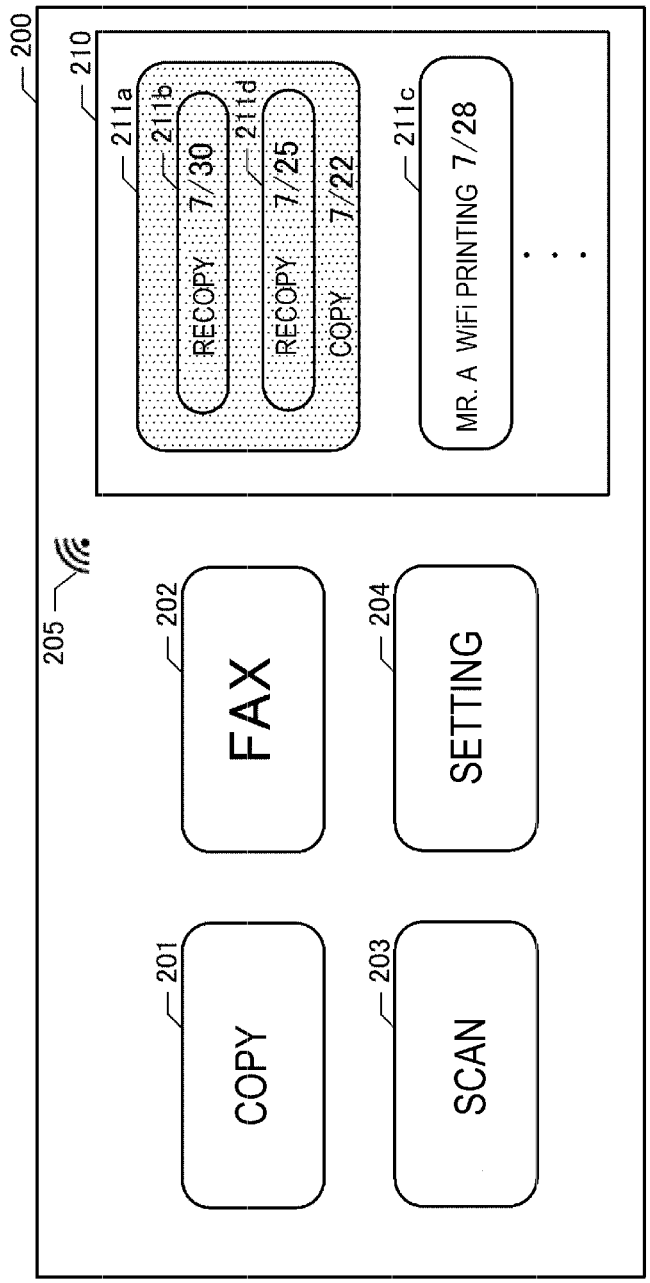
FIG. 3 is a diagram showing an example of the main screen.

When there are a plurality of history items 211 about the reoperation of the original operation, the processor 110 displays the plurality of history items 211 about the reoperation to be nests of the history item 211 corresponding to the original operation. In an example shown in FIG. 3, the processor 110 displays, in addition to the history item 211b, the history item 211d corresponding to reprinting based on the history item 211a performed on July 25 as a nest of the history item 211a. In this case, the processor 110 displays, in addition to the history item 211a, the history item 211d together with the history item 211b. Therefore, the processor 110 does not display the history item 211d in time-series.

With the configuration explained above, the multifunction peripheral 100 displays the history item 211 corresponding to the reoperation of the original operation in a display form having a display relation with the history item 211 corresponding to the original operation. Consequently, the multifunction peripheral 100 can display a plurality of history items 211 having a relation in which corresponding operations are the same operations to make it possible to visually recognize that the plurality of history items 211 have such a relation. As a result, the user can easily grasp, among the displayed history items 211, items having a relation in which the items correspond to operation histories of the same operation.

(1-2) Details of Processing of the Printing Apparatus

Details of processing of the multifunction peripheral 100 are explained with reference to a flowchart of FIG. 4.

Figure 4:
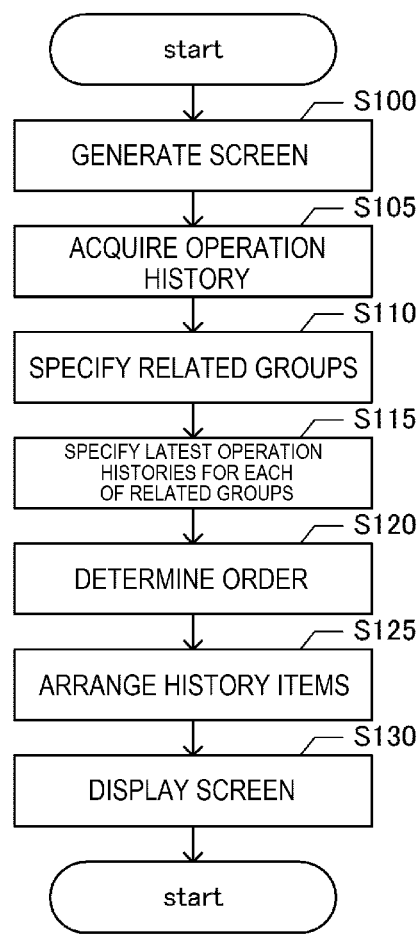
FIG. 4 is a flowchart showing an example of processing of the printing apparatus.

In this embodiment, the processor 110 executes processing shown in FIG. 4 when generating a decided screen (for example, the main screen 200 or a setting screen for an operation mode) including the history display region 210.

In S100, the processor 110 functions as the display control section 110a and generates information concerning a screen and stores the information in the RAM. More specifically, the processor 110 generates configuration information of the screen (information such as items forming the screen and arrangement positions of the items) as the information concerning the screen and stores the configuration information in the RAM.

In S105, the processor 110 functions as the display control section 110a and acquires operation histories in the past from the storage medium 140.

In S110, the processor 110 functions as the display control section 110a and specifies related groups from the operation histories acquired in S105. More specifically, the processor 110 specifies, as related groups, operation histories associated with information, which indicates a reoperation based on the same history item 211, and operation histories corresponding to the history item 211.

In S115, the processor 110 functions as the display control section 110a and specifies, about the respective related groups specified in S110, the latest operation history among the operation histories included in the related groups.

In S120, the processor 110 functions as the display control section 110a and determines time-series order about the operation histories specified for each of the related groups in S115 and operation histories not belonging to all the related groups. More specifically, the processor 110 determines, based on dates and times associated with the respective operation histories, order of the respective operation histories in descending order of the associated dates and times.

In S125, the processor 110 functions as the display control section 110a and processes, as explained below, the history items 211 indicating the operation histories specified for each of the related groups in S115 and the history items 211 indicating the operation histories not belonging to all the related groups. That is, the processor 110 adjusts the information concerning the screen stored in the RAM to include these history items 211 in the history display region 210 side by side in the order determined in S120.

The processor 110 displays the history item 211 indicating the latest operation history of the related group to be a nest of the history item 211 indicating the operation history of the original operation in the related group corresponding to the related group. That is, the processor 110 includes the history item 211 indicating the latest operation history of the related group in the history item 211 corresponding to the original operation. The processor 110 sets the history item 211 indicating the latest operation history of the related group to a color common to the history item 211 corresponding to the original operation. The processor 110 sets colors of the history items 211 to be different for each of the related groups. The processor 110 sets a color of the history items 211 not belonging to all the related groups to a color different from colors of the history items 211 of all the related groups.

In S130, the processor 110 displays, based on the information concerning the screen stored in the RAM, a screen corresponding to the information on the display section 120.

(2) Second Embodiment (2-1) Configuration of a Printing Apparatus

The multifunction peripheral 100 in this embodiment is different from the multifunction peripheral 100 in the first embodiment in that the display control section 110a includes a function of narrowing down, according to a selected item, the history items 211 to be included in the history display region 210.

In this embodiment, the processor 110 performs communication with an external device via the communication section 160 using one decided port and acquires a printing job from the external device. The printing job is a job of printing performed using the printing section 150. The job is control information for causing the multifunction peripheral 100 to perform an operation. Therefore, the printing job is printing control information for causing the printing section 150 to perform printing. The printing job is, for example, information including data of a printing target such as a PDF and printing setting information (setting of, for example, a paper size and a color) and information including data rasterized from the PDF and control information (for example, data indicating nozzles for each pixel). The port is information for identifying an application used for communication. In the following explanation, the decided port is a wireless communication port. However, the processor 110 may perform communication with an external device via the communication section 160 and acquire a printing job from the external device using a plurality of decided ports. The processor 110 performs communication with the built-in scanner 170, acquires scan data from the built-in scanner 170, and acquires a printing job about the acquired scan data using a decided port. In the following explanation, the port used for the communication with the built-in scanner 170 is referred to as scanner communication port. In this way, the processor 110 acquires the printing jobs using a plurality of ports.

When any one of the history items 211 is selected based on operation on the input section 130 by the user, the processor 110 shifts to an operation mode corresponding to the selected history item 211. More specifically, the processor 110 displays a setting screen concerning the operation mode on the display section 120. The setting screen is a screen used for an instruction for an operation in the operation mode corresponding to the setting screen and a change of operation settings. The processor 110 adjusts values of setting items, which can be set via the setting screen, to the same values as values of setting items in the selected history item 211. The processor 110 controls display forms of items on the setting screen according to the adjusted values of the setting items. When the user desires to perform an operation under the same conditions as conditions of an operation in the past, the user only has to select the history item 211 or may not input various settings to be the same values as values of the setting items in the past. That is, the processor 110 enables the operation under the same conditions as the conditions of the operation performed in the past to be more easily executed.

When the number of history items 211 displayed in the history display region 210 increases, the user searches for a target history item 211 from a larger number of history items 211. Time for searching for the history item 211 increases. It is difficult to search for the history item 211.

Therefore, in this embodiment, the processor 110 functions as the display control section 110a and performs the following according to selection of any one of the mode items 201 to 204. That is, the processor 110 extracts operation histories concerning operation modes corresponding to the selected mode items 201 to 204 out of operation histories in the past of the multifunction peripheral 100 stored in the storage medium 140. The processor 110 switches the display of the display section 120 to display a setting screen about the operation modes corresponding to the selected mode items, the setting screen including the history display region 210 in which the history items 211 indicating the extracted operation histories are displayed.

In this embodiment, the processor 110 functions as the display control section 110a and performs the following according to selection of the radio wave mark 205. That is, the processor 110 extracts an operation history of a printing job acquired by wireless communication corresponding to the radio wave mark 205 out of the operation histories in the past of the multifunction peripheral 100 stored in the storage medium 140. That is, the processor 110 extracts, out of the operation histories stored in the storage medium 140, an operation history of a printing job acquired using the wireless communication port corresponding to the radio wave mark 205, the printing job having been executed in the past by the multifunction peripheral 100. The processor 110 switches the display of the display section 120 to display the history item 211 indicating the extracted operation history.

Figure 5:
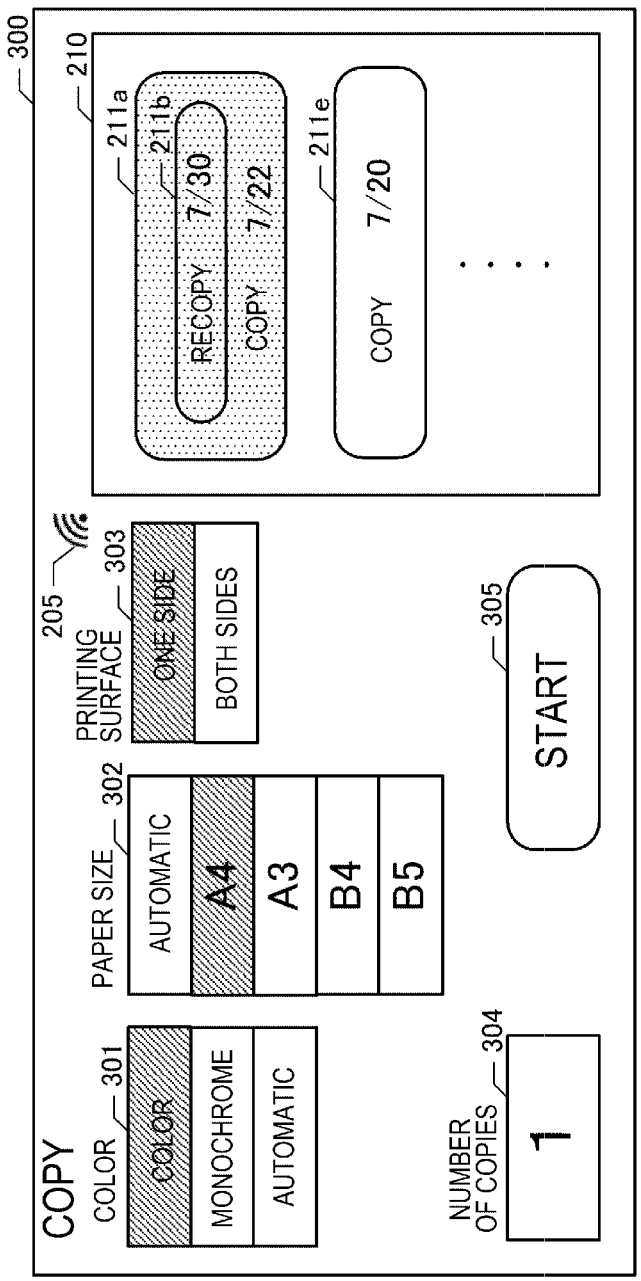
FIG. 5 is a diagram showing an example of a setting screen concerning copying.

For example, when the mode item 201 is selected by the user, the processor 110 switches the display of the display section 120 to display a setting screen 300 concerning the copy mode shown in FIG. 5. More specifically, when the mode item 201 is selected, the processor 110 extracts information concerning an operation history of an operation (copying) in the copy mode out of the information concerning the operation histories of the multifunction peripheral 100 stored in the storage medium 140. The processor 110 acquires information concerning the setting screen 300 (information such as items in the screen and arrangement positions of the items) from the storage medium 140, generates the setting screen 300 based on the acquired information, and stores the generated information concerning the setting screen 300 in the RAM.

In an example shown in FIG. 5, the setting screen 300 includes a color selection region 301, a paper size selection region 302, a printing surface selection region 303, a number of copies designation region 304, an execution button 305, the radio wave mark 205, and the history display region 210.

The color selection region 301 is a region used for selection of color setting in printing. In the example shown in FIG. 5, the color setting can be selected out of "color" (printing in color), "monochrome" (printing in monochrome), and "automatic" (printing by determining and setting color or monochrome). In the example shown in FIG. 5, "color" is selected.

The paper size selection region 302 is a region used for selection of a size of paper to be printed. In the example shown in FIG. 5, the paper size can be selected out of "automatic" (setting for determining to which size the paper size is set), "A4", "A3", "B4", and "B5". In the example shown in FIG. 5, "A4" is selected.

The printing surface selection region 303 is a region used for selection of a printing surface. In the example shown in FIG. 5, the printing surface can be selected out of "one side" and "both sides". In the example shown in FIG. 5, "one side" is selected.

The number of copies designation region 304 is a region used for designation of the number of copies. In the example shown in FIG. 5, 1 is designated as the number of copies. The execution button 305 is a button used for designation of execution of printing. When the processor 110 functions as the operation control section 110c and detects selection of the execution button 305, the processor 110 executes printing under conditions corresponding to values set in the color selection region 301, the paper size selection region 302, the printing surface selection screen 303, and the number of copies designation region 304.

When generating the setting screen 300, the processor 110 includes, in the history display region 210, the history items 211 indicating extracted operation histories, that is, in this example, operation histories corresponding to the copy mode to be timeline-displayed. In this case, as in the first embodiment, the processor 110 displays the history item 211 corresponding to the reoperation in a display form having a display relation with the history item 211 corresponding to the original operation.

In this way, when the copy mode is selected, the processor 110 switches the display of the display section 120 to display the history items 211 about the copy mode. Consequently, in the copy mode, by not displaying unnecessary history items 211 concerning the operation modes different from the copy mode, the processor 110 can reduce the number of history items 211 to be displayed and make it easier for the user to search for a target history item 211.

In this embodiment, when the history item 211 concerning the copy mode is selected, the processor 110 functions as the operation control section 110c and performs the following. That is, the processor 110 performs control to enable reprinting of a printing job corresponding to the selected history item 211, the printing job being a printing job performed in the past stored in the storage medium 140 by the function of the storage control section 110d. More specifically, the processor 110 acquires information concerning the printing job corresponding to the history item 211 selected from the storage medium 140. The processor 110 sets an image indicated by the acquired printing job as a printing target image and adjusts printing setting (setting of, for example, a color, a paper size, and a printing surface) to the same values as values of the acquired printing job. In this way, the processor 110 enables reprinting of the printing job. Note that, unless specifically noted otherwise, a reoperation in this embodiment includes not only a reoperation in a narrow sense for performing, based on image data stored as a part of an operation history, an operation again in setting stored as a part of the operation history but also a reoperation in a broad sense for performing, using setting stored as a part of the operation history, an operation based on new image data. Accordingly, the reprinting includes not only reprinting in a narrow sense for performing, based on image data stored as a part of an operation history, printing again using setting stored as a part of the operation history but also reprinting in a broad sense for performing, using setting stored as a part of the operation history, printing based on new image data generated by performing scanning anew.

The processor 110 functions as the display control section 110a and displays the setting screen 300. In that case, the processor 110 sets respective displays in the color selection region 301, the paper size selection region 302, the printing surface selection region 303, and the number of copies designation region 304 to be displays corresponding to printing setting adjusted by the function of the operation control section 110c. When detecting selection of the execution button 305, the processor 110 executes printing to produce a print.

In this way, the processor 110 functions as the operation control section 110c and, when the history item 211 concerning the copy mode is selected, enables reprinting of a printing job corresponding to the selected history item 211. Consequently, when reprinting of a printing job performed in the past is desired, the multifunction peripheral 100 can more easily enable the reprinting. By changing setting, it is also possible to more easily perform the reprinting in which a part of the setting is changed.

With the configuration explained above, the multifunction peripheral 100 displays the main screen 200 including a plurality of items selectable by the user and operation histories (history items) in the past. According to selection of one item, the multifunction peripheral 100 switches the display of the display section 120 to display a setting screen corresponding to the selected item, the setting screen including the history item 211 corresponding to the selected item among the history items 211. In this way, the multifunction peripheral 100 displays, in time-series order, the history items 211 corresponding to items selected by the user to not display unnecessary history items 211. Consequently, the processor 110 can reduce the number of history items 211 to be displayed and make it easier for the user to search for a target history item 211.

(2-2) Details of Processing of the Printing Apparatus

Details of processing of the multifunction peripheral 100 in this embodiment are explained with reference to flowcharts of FIGS. 6 and 7.

Figure 6:
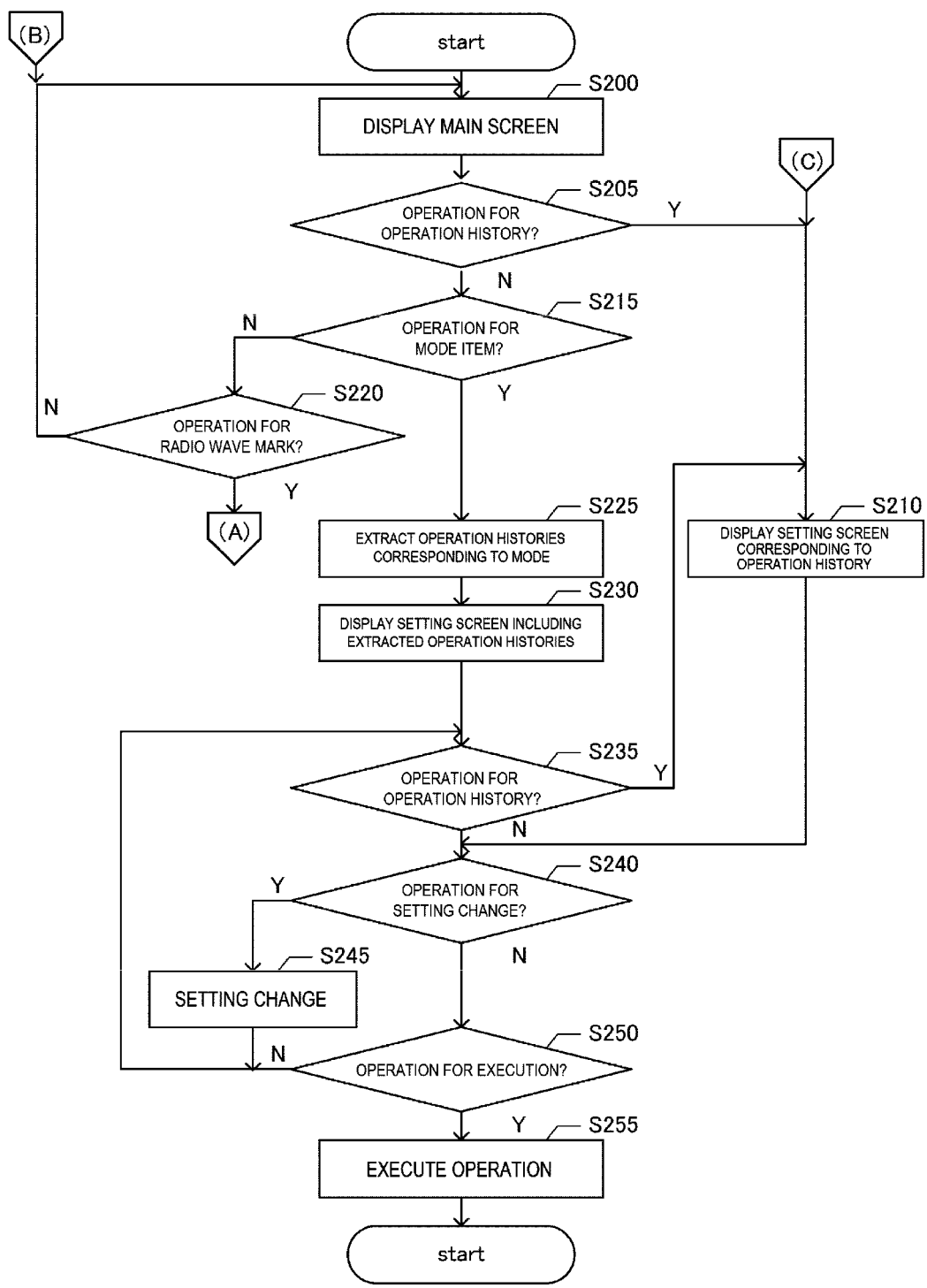
FIG. 6 is a flowchart showing an example of processing of the printing apparatus.
Figure 7:
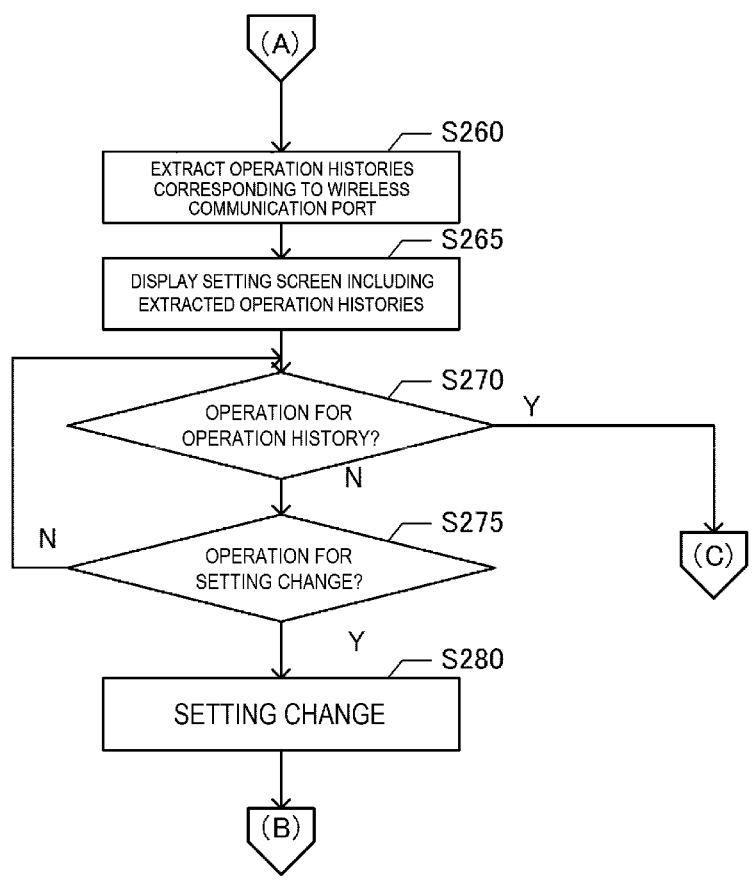
FIG. 7 is a flowchart showing the example of the processing of the printing apparatus.

In this embodiment, when the multifunction peripheral 100 is started, the processor 110 starts processing shown in FIGS. 6 and 7.

In S200, the processor 110 functions as the display control section 110a and displays the main screen 200 on the display section 120. Details of the processing in S200 are the same as the processing of the flowchart of FIG. 4. However, in this case, the processor 110 generates the main screen 200 in S100 in FIG. 4 and stores the main screen 200 in the RAM.

In S205, the processor 110 functions as the display control section 110a and determines whether operation for selecting the history item 211 included in the history display region 210 of the main screen 200 is performed via the input section 130. When determining that the operation for selecting the history item 211 is performed, the processor 110 advances the processing to S210. When determining that the operation for selecting the history item 211 is not performed, the processor 110 advances the processing to S215.

In S210, the processor 110 functions as the display control section 110a and displays, on the display section 120, a setting screen for an operation mode corresponding to the history item 211, the operation for selecting which is determined as being performed in S205. The processor 110 adjusts values of setting items, which can be set via the setting screen, to be the same as values of the setting items in the operation history indicated by the selected history item 211. The processor 110 adjusts a display form of items corresponding to the setting items in the setting screen to a display form corresponding to the adjusted values.

In S215, the processor 110 functions as the display control section 110a and determines whether operation for selecting any one of the mode items 201 to 204 of the main screen 200 is performed via the input section 130. When determining that the operation for selecting any one of the mode items 201 to 204 is performed, the processor 110 advances the processing to S225. When determining that the operation for selecting any one of the mode items 201 to 204 is not performed, the processor 110 advances the processing to S220. In the following explanation, a mode item, the operation for selecting which is determined as being performed in S215, is referred to as selected mode item.

In S220, the processor 110 functions as the display control section 110a and determines whether operation for selecting the radio wave mark 205 of the main screen 200 is performed via the input section 130. When determining that the operation for selecting the radio wave mark 205 is performed, the processor 110 advances the processing to S260.

When determining that the operation for selecting the radio wave mark 205 is not performed, the processor 110 advances the processing to S205.

In S225, the processor 110 functions as the display control section 110a and extracts operation histories concerning an operation mode corresponding to the selected mode item out of information concerning operation histories in the past of the multifunction peripheral 100 stored in the storage medium 140.

In S230, the processor 110 functions as the display control section 110a and generates a setting screen for the operation mode corresponding to the selected mode item. The processor 110 arranges, in the history display region 210 in the generated setting screen, in time-series order, the history items 211 indicating the operation histories extracted in S225. The processor 110 displays, on the display section 120, the setting screen including the history items 211.

Details of the processing in S230 are the same as the processing of the flowchart of FIG. 4 except the processing in S105. In S105 in FIG. 4, the processor 110 acquires the operation histories extracted in S225. In this case, in S100 in FIG. 4, the processor 110 generates a setting screen for an operation mode corresponding to a selected mode item, the setting screen including the history display region 210, and stores the setting screen in the RAM.

In S235, the processor 110 functions as the display control section 110a and determines whether operation for selecting the history item 211 included in the history display region 210 of the setting screen displayed in S230 is performed via the input section 130. When determining that the operation for selecting the history item 211 is performed, the processor 110 advances the processing to S210. When determining that the operation for selecting the history item 211 is not performed, the processor 110 advances the processing to S240.

In S240, the processor 110 functions as the display control section 110a and determines whether operation for a setting change about operations is performed via the setting screen displayed in S230. The operation for the setting change about operations includes, for example, operation for changing a value about any one of the color selection region 301, the paper size selection region 302, the printing surface selection region 303, and the number of copies designation region 304 in the copy mode. The operation for the setting change about operations includes, for example, operation for a setting change via a screen displayed according to selection of an item (for example, a color setting button) in the setting screen.

When determining that the operation for the setting change about operations is performed, the processor 110 advances the processing to S245. When determining that the operation for the setting change about operations is not performed, the processor 110 advances the processing to S250.

In S245, the processor 110 functions as the operation control section 110c and performs a setting change for operations corresponding to the operation determined as being performed in S240. More specifically, the processor 110 receives a value after a change of a setting item by the operation determined as being performed in S240 and stores the received value in the RAM to perform the setting change.

In S250, the processor 110 determines whether operation for selecting an execution button (for example, the execution button 305) included in the setting screen displayed in S230 and used for an instruction for execution of operations is performed via the input section 130. When determining that the operation for selecting the execution button is performed, the processor 110 advances the processing to S255. When determining that the operation for selecting the execution button is not performed, the processor 110 advances the processing to S235.

In S255, the processor 110 executes an operation in the operation mode corresponding to the selected mode item and ends the processing shown in FIGS. 6 and 7. For example, when the operation mode is the copy mode, the processor 110 functions as the printing section 150 and performs printing to produce a print.

In S260, the processor 110 functions as the display control section 110a and extracts, from the storage medium 140, operation histories about printing jobs acquired using the wireless communication port corresponding to the radio wave mark 205, the printing jobs having been executed in the past.

In S265, the processor 110 functions as the display control section 110a and generates, on the RAM, a setting screen corresponding to the wireless communication port (a setting screen concerning communication performed using the wireless communication port). The processor 110 includes, in the history display region 210 in the generated setting screen, side by side, in time-series order, the history items 211 acquired in S260. The processor 110 refers to the RAM and displays, on the display section 120, the setting screen including the history items 211.

Details of the processing in S265 is the same as the processing of the flowchart of FIG. 4 except the processing in S105. In S105 in FIG. 4, the processor 110 acquires the operation histories extracted in S260. In this case, in S100 in FIG. 4, the processor 110 generates a setting screen concerning communication performed using the wireless communication port, the setting screen including the history display region 210, and stores the setting screen in the RAM.

In S270, the processor 110 determines whether operation for selecting the history item 211 included in the history display region 210 of the setting screen displayed in S265 is performed via the input section 130. When determining that the operation for selecting the history item 211 is performed, the processor 110 advances the processing to S210. When determining that the operation for selecting the history item 211 is not performed, the processor 110 advances the processing to S275.

In S275, the processor 110 functions as the display control section 110a and determines whether operation for a setting change about communication performed using the wireless communication port is performed via the setting screen displayed in S265. The operation for the setting change about communication includes, for example, operation for a setting change via a screen displayed according to selection of an item in the setting screen 300.

When determining that the operation for the setting change about communication is performed, the processor 110 advances the processing to S280. When determining that the operation for the setting change about communication is not performed, the processor 110 advances the processing to S270.

In S280, the processor 110 functions as the operation control section 110c and performs a setting change of communication corresponding to the operation determined as being performed in S275. The processor 110 advances the processing to S200.

(3) Other Embodiments

The embodiments explained above are examples for carrying out the present disclosure. Various other embodiments can be adopted. The embodiments explained above are examples. Embodiments in which a part of the components are omitted and other components are added or replaced can be adopted. The first embodiment and the second embodiment can be combined.

In the embodiments, the display relation is the relation in which a color is common and the nested relation. However, the display relation is not limited to these relations if a relation of histories is seen. For example, the display relation may be at least one of a relation in which at least one of a shape, a color, and a pattern is common and the nested relation. Specifically, the display relation may be a relation in which a pattern is common. In that case, the processor 110 displays the history item 211 corresponding to the original operation and the history item 211 corresponding to the reoperation to have a common pattern.

Consequently, the multifunction peripheral 100 can display a plurality of history items 211 having a relation in which corresponding operations are the same operations to make it possible to more easily visually recognize the plurality of history items 211.

In the embodiments, even when there are the plurality of history items 211 corresponding to the reoperation of the original operation, the processor 110 displays the plurality of history items 211 as nests of the history item 211 corresponding to the original operation. When an excessively large number of history items 211 are included in the history item 211 of the original operation as nests, the size of the history item 211 of the original operation is excessively large and, for example, the entire history item 211 cannot be displayed on the display section 120 at a time. Visibility of the user is deteriorated.

Accordingly, when there are the plurality of history items 211 corresponding to the reoperation, the processor 110 may display only a predetermined number of (for example, two, three, four, or five) history items 211 of the reoperation as nests of the history item 211 of the original operation.

For example, the processor 110 may display, among the history items 211 corresponding to the reoperation, a predetermined number of history items 211 in order from the history item 211 having the earliest execution period of operations as nests of the history item 211 corresponding to the original operation. In this case, the processor 110 does not display the remainder of the history items 211 corresponding to the reoperation as nests of the history item 211 corresponding to the original operation and timeline-displays the remainder in the same manner as the other history items 211.

Figure 8:
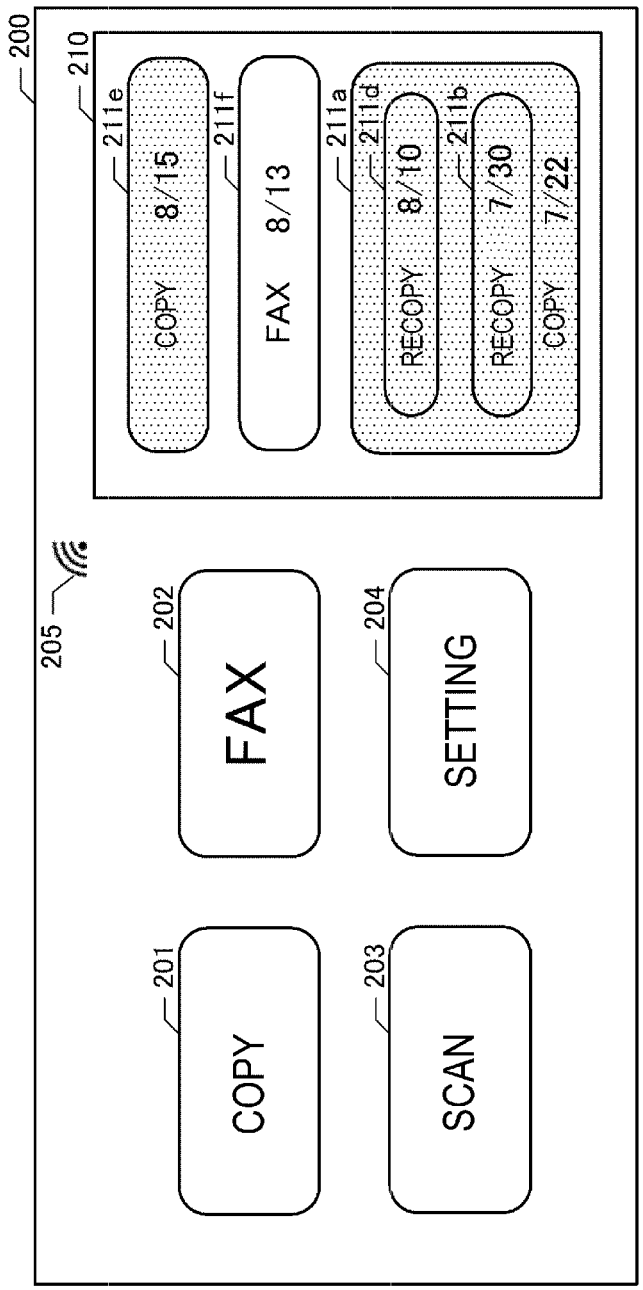
FIG. 8 is a diagram showing an example of a main screen.

For example, in an example shown in FIG. 8, with respect to the history item 211a corresponding to the original operation, there are three history items 211 (the history item 211b, the history item 211d, and the history item 211e) corresponding to the reoperation based on the history item 211a. It is assumed that the number of history items 211 that can be nested in the history item 211 corresponding to the original operation is two. Therefore, the processor 110 specifies two history items (the history item 211b and the history item 211d) having the earliest execution period of operations among the history item 211b, the history item 211d, and the history item 211e. The processor 110 displays the specified two history items to be nests of the history item 211a corresponding to the original operation and displays the remaining history item 211e in the same manner as the other history items 211.

Consequently, the multifunction peripheral 100 can prevent the size of the history item 211 including the other history items 211 as nests from becoming excessively large and prevent the visibility of the user from being deteriorated.

In this case, the processor 110 may display, as explained below, among the history items 211 corresponding to the reoperation, the history items 211 not displayed as nests of the history item 211 corresponding to the original operation. That is, the processor 110 may display the history items 211 such that at least one of a shape, a color, and a pattern of the history items 211 is common to the history item 211 corresponding to the original operation.

Consequently, the multifunction peripheral 100 can make it possible to easily visually grasp that the history items 211 corresponding to the reoperation not to be nests also have a relation with the history item 211 corresponding to the original operation.

In the embodiments, the multifunction peripheral 100 displays, on the main screen 200, the setting screen for the operation mode (the setting screen 300 or the like), or the screen corresponding to the port, the history item 211 corresponding to the reoperation in the display form having the display relation with the history item 211 corresponding to the original operation. However, the multifunction peripheral 100 may display, on a part of the main screen 200, the setting screen for the operation mode, or the screen corresponding to the port, the history item 211 corresponding to the reoperation in the display form having the display relation with the history item 211 corresponding to the original operation.

The operation history only has to be able to indicate a history of some operation performed in the printing apparatus. The operation history may indicate a history of the operation (copying, FAX transmission, or the like) corresponding to the operation mode as in the embodiments or may indicate a history of an operation for changing setting items. The operation history may indicate a history of an operation for receiving operation of the user or may indicate a history of maintenance or the like performed on the printing apparatus.

The timeline display only has to be a display in time-series order about a period when an operation corresponding to the timeline display was executed.

The item only has to be an object on a displayed image, the object being able to receive selection.

The reprinting based on the item only has to be printing performed according to selection of an item indicating an operation history of printing, the printing being the same as the operation of the operation history.

The decided relation only has to be a relation that can indicate that items displayed in a display form having this relation have relevance.

Further, the present disclosure is also applicable as a program executed by a computer and a method. The present disclosure can also be applied to a device not having a printing function and a program and a method of the device. The present disclosure may be applied to, for example, a network scanner not having the printing function. The program and the method explained above are realized as an independent apparatus in some cases and are realized using components included in a plurality of apparatuses in other cases. The program and the method include various forms. The program and the method can be changed as appropriate, for example, a part of the program and the method is software and a part of the program and the method is hardware. Further, an invention is established as a recording medium for a program. Naturally, the recording medium for the program may be a magnetic recording medium or may be a semiconductor memory or the like. All recording media to be developed in future can be considered completely the same.

What is claimed is:

1. A printing apparatus that performs timeline display of a plurality of items corresponding to operation histories in past, the printing apparatus comprising:
 a processor including
  a receiving section configured to receive reprinting based on a first item selected out of the timeline-displayed plurality of items; and
  a display control section configured to timeline-display a second item indicating an operation history of the reprinting that has been Performed in response to the receiving section receiving the reprinting based on the first item, in a display form having a decided relation between the second item and the first item, and timeline-display a third item corresponding to an operation history different from both of the operation history of the reprinting that has been performed in response to the receiving section receiving the reprinting based on the first item and an operation history of the reprinting based on the second item, in a display form not having the decided relation with both of the first item and the second item.

2. The printing apparatus according to claim 1, wherein the decided relation is a relation in which at least one of a shape, a color, and a pattern is common and a nested relation.

3. The printing apparatus according to claim 1, wherein, when a number of the second items is larger than a decided number, the display control section displays the decided number of the second items to be nests of the first item in descending order of periods when operations corresponding to the second items were executed and displays the remaining second items not to be nests of the first item.

4. The printing apparatus according to claim 3, wherein, when the number of the second items is larger than the decided number, the display control section displays the decided number of the second items to be nests of the first item in the descending order of the periods when the operations corresponding to the second items were executed and displays the remaining second items not to be nests of the first item and to make at least one of a shape, a color, and a pattern of the remaining second items to be common to the first item.

5. The printing apparatus according to claim 1, wherein, when an operation corresponding to the third item is executed between an operation corresponding to the first item and an operation corresponding to the second item, the display control section performs control to display the second item to be a nest of the first item and not to display the third item between the first item and the second item.

6. The printing apparatus according to claim 1, wherein the receiving section is further configured to receive reprinting based on the second item.

7. The printing apparatus according to claim 1, wherein the receiving section is further configured to receive reprinting based on the third item.

8. A print producing method executed by a printing apparatus that performs timeline display of a plurality of items corresponding to operation histories in past, the print producing method comprising:
 receiving reprinting based on a first item selected out of the timeline-displayed plurality of items;
 timeline-displaying a second item indicating an operation history of the reprinting that has been performed in response to the receiving of the reprinting based on the first item, in a display form having a decided relation between the second item and the first item and timeline-displaying a third item corresponding to an operation history different from both of the operation history of the reprinting that has been performed in response to the receiving of the reprinting based on the first item and an operation history of the reprinting based on the second, item in a display form not having the decided relation with both of the first item and the second item; and when any one of the plurality of items is selected by a user, performing the reprinting according to setting included in an operation history corresponding to the selected item to produce a print.

9. A non-transitory computer-readable storage medium storing a program for causing a computer, which performs timeline display of a plurality of items corresponding to operation histories in past, to function as:

a receiving function for receiving a reoperation based on a first item selected out of the timeline-displayed plurality of items; and a display control function for timeline-displaying a second item indicating an operation history of the reoperation that has been performed in response to the receiving of the reoperation based on the first item, in a display form having a decided relation between the second item and the first item and timeline-displaying a third item corresponding to an operation history different from both of the operation history of the reoperation that has been performed in response to the receiving of the reoperation based on the first item and an operation history of the reoperation based on the second item, in a display form not having the decided relation with both of the first item and the second item.

* * * * *